(12) United States Patent
Bowman (10) Patent No.: US 6,549,557 B1
(45) Date of Patent: Apr. 15, 2003

(54) AC ARC FURNACE WITH AUXILIARY ELECTROMAGNETIC COIL SYSTEM FOR CONTROL OF ARC DEFLECTION

(75) Inventor: Brian Bowman, Westlake, OH (US)

(73) Assignee: UCAR Carbon Compan, Inc., Wilmington, DE (US)

( * ) Notice: Subject to any disclaimer, the term of this patent is extended or adjusted under 35 U.S.C. 154(b) by 0 days.

(21) Appl. No.: 09/860,887

(22) Filed: May 18, 2001

(51) Int. Cl.$^7$ ................................................ H05B 7/22
(52) U.S. Cl. ............................ 373/64; 373/61; 373/85; 373/107
(58) Field of Search ................................ 373/60, 61, 62, 373/64, 66, 102, 104, 107, 72, 85; 315/147, 338

(56) References Cited

U.S. PATENT DOCUMENTS

| | | | |
|---|---|---|---|
| 1,404,734 A | * 1/1922 | Bennett | 373/85 |
| 1,496,299 A | * 6/1924 | Clifford | 373/102 |
| 2,652,440 A | 9/1953 | Simmons | 13/11 |
| 3,683,094 A | 8/1972 | Schlienger | 13/9 |
| 4,034,146 A | 7/1977 | Stenkvist | 13/11 |
| 4,038,483 A | 7/1977 | Stenkvist | 13/11 |
| 4,110,546 A | 8/1978 | Stenkvist | 13/11 |
| 4,149,024 A | 4/1979 | Stenkvist et al. | 13/11 |
| 4,495,625 A | 1/1985 | Heberlein et al. | 373/107 |
| 4,581,745 A | 4/1986 | Mathews et al. | 373/107 |
| 4,805,186 A | 2/1989 | Janiak et al. | 373/79 |
| 4,815,097 A | 3/1989 | Bellan | 373/107 |
| 4,856,021 A | 8/1989 | Janiak et al. | 373/108 |
| 4,931,702 A | 6/1990 | Voronin et al. | 315/344 |
| 5,138,629 A | 8/1992 | Maki e tal. | 373/64 |
| 5,138,630 A | 8/1992 | Suga | 373/107 |
| 5,189,682 A | 2/1993 | Maki et al. | 373/64 |
| 5,317,591 A | 5/1994 | Stenkvist | 373/107 |
| 5,381,441 A | 1/1995 | Nix | 373/72 |
| 5,526,374 A | 6/1996 | Uebber | 373/107 |
| 5,956,366 A | 9/1999 | Shimizu et al. | 373/108 |
| 5,960,027 A | 9/1999 | Kiyohara et al. | 373/107 |

OTHER PUBLICATIONS

Scheibe, H.–J. (1996) "Impact of Magnetic Fields on the Motion Behaviour of an Arc in a High–Temperature Plasma Furnace", *Elektrowarme Int.*, Ed. B, 4:B194–B199 (German Language).

Japan Patent No. Hesei 10–318684 "Direct Current Arc Furnace" (English Language translation).

Japan Patent No. 3–147289 "Eccentric Furnace Bottom Type DC Arc Furnace . . . Magnetic Field" (Japanese Language).

Japan Patent No. 3–140791 "DC Arc Furnace . . . Z–R Rotation Symmetry Component is Generated " (Japanese Language).

Japan Patent No. 1–97394 "DC Arc Furnace Arc Control Process . . . Current In Coils" (Japanese Language).

(List continued on next page.)

*Primary Examiner*—Tu Ba Hoang
(74) *Attorney, Agent, or Firm*—James R. Cartiglia (57) ABSTRACT

An AC arc furnace has a plurality of electrodes arranged inside a furnace chamber enclosed by a shell. Each electrode is electrically connected to an electrode power source in series through corresponding auxiliary electromagnetic coils. The electromagnetic coils are arranged around the furnace shell in a pre-defined geometric pattern proximate the corresponding electrodes so that when each of the electrodes receives power from the power source and generates an arc inside the furnace, external magnetic fields are generated by the corresponding series connectedelectromagnetic coils. The external magnetic fields penetrate the shell to control deflection of the arcs caused by internal magnetic fields.

11 Claims, 11 Drawing Sheets

OTHER PUBLICATIONS

Soviet Union Patent No. SU1453627 "Three Phase Arc Furnace Electrode Unit . . . " (Russian Language).

BSW Report BMFT–FB–T83–282 "Elektromagnetic Control of Arc Flare in Electric Furnaces" (1983) Miscellaneous Documents.

Bowman, B. (1993) "Technical Comparison of AC and DC Furnaces", Iron and Steelmaker, 20:55–59.

Bowman, B. (1979) "Distribution of Current and Self–Induced Stirring Force in the Bath of an ARC Furnace", Paper presented at Elektrowarme Int., Sep. 10, 1979, 12+ p.

* cited by examiner

AC ARC FURNACE WITH AUXILIARY ELECTROMAGNETIC COIL SYSTEM FOR CONTROL OF ARC DEFLECTION

BACKGROUND OF THE INVENTION

The present invention relates generally to arc furnaces used in the making of steel. More particularly, this invention pertains to AC arc furnaces having an auxiliary system to control undesirable arc deflection within the furnace.

In a typical AC arc furnace used in steel making operations, three graphite electrodes are vertically positioned as columns within a cylindrical furnace shell. The upper ends of the electrodes are mechanically secured to electrode terminals and are each electrically connected in a "delta" arrangement to a three-phase AC electrode power circuit exterior to the shell. In response to a conventional regulation and control circuit associated with the electrode power circuit, arcs are generated between the electrode tips and conductive material placed at the bottom of the furnace. This begins the heating, melting, and refining processes familiar to those who design and operate AC arc furnaces for use in the making of steel.

One problem that is well known to engineers who design AC arc furnaces is arc deflection caused by magnetic fields present inside the furnace. These internal magnetic fields are generated by electromagnetic interaction of the current flowing through each of the electrode current loops formed by the electrode power circuit, electrode, arc, and conductive material at the bottom of the furnace. Arc deflection, in which the arcs are caused to extend outwardly from the electrodes at an angle rather than vertically in line with the electrode columns, has several undesirable effects on furnace operation. For example, arc deflection, sometimes referred to as arc blowout or arc flare, moves the arc laterally toward the furnace shell. This results in an uneven heat distribution inside the furnace, producing what are commonly known as "hot spots" and "cold spots". In some cases, auxiliary burners must be used to compensate for cold spots and energy is lost in furnace water-cooling systems from the hot spots. Arc deflection also produces non-uniform melting of the material inside the furnace which can cause scrap "falls" and electrode breakage.

There have been attempts made in the prior art to use externally generated magnetic fields as a means of controlling arcs inside an arc furnace. For example, in U.S. Pat. No. 4,034,146 issued to Stenkvist in 1977, an external electromagnetic coil is positioned underneath a three-phase AC arc furnace. The coil generates a (DC) magnetic field inside the furnace to intersect and "steer" the arcs away from the furnace sidewalls. However, this is not an entirely satisfactory solution to the problem of arc deflection because the primary effect of the Stenkvist system is merely to spread the arc blowout effect over a larger radial angle.

In U.S. Pat. No. 5,960,027 issued in 1999 to Kiyohara et al., a DC arc furnace is provided with an auxiliary electromagnetic coil system for controlling arc deflection. One or more U-shaped auxiliary coils are arranged around the furnace shell and are connected in series with the DC electrode power circuit. The auxiliary coils are physically oriented in respective planes so as to generate a magnetic field that will cancel the magnetic field generated by the DC current flowing through the power circuit. Unfortunately, the system described by Kiyohara et al. is not adaptable to AC arc furnaces.

What is needed, then, is an AC arc furnace having an auxiliary system for controlling arc deflection produced by electromagnetic fields generated by multiple electrode current loops inside the furnace.

SUMMARY OF THE INVENTION

The AC arc furnace of the present invention includes a furnace shell, which is typically cylindrical, enclosing the furnace chamber. Multiple electrodes are positioned vertically within the chamber, with each of the electrodes connected to an external electrode power circuit to generate and sustain an arc between the electrodes and material to be melted that is placed in a lower portion of the chamber. An auxiliary coil system is connected to a coil power circuit, the auxiliary coil system having a plurality of coils corresponding to the number of electrodes. Each coil is arranged around the furnace shell proximate to a corresponding electrode in a defined coil geometry so that when the coil power circuit is activated, each coil generates an external magnetic field that penetrates the shell to control deflection of the arc of a corresponding electrode.

In a preferred embodiment, each coil is electrically connected in series with its corresponding electrode so that the electrode power circuit also functions as the coil power circuit. Also, lamination structures are positioned outside of and proximate to each of the coils to reduce the magnitude of any external magnetic fields generated by the coils. The furnace shell includes at least one non-magnetic window positioned to facilitate penetration into the furnace of the magnetic fields generated by the auxiliary coil system Each coil of the auxiliary coil system is arranged around the shell and connected to the coil power circuit so that the external magnetic field applied to the arcs has a magnitude and direction that effectively cancels out an internal magnetic field generated by the arc itself and by the electrode power circuit.

BRIEF DESCRIPTION OF THE DRAWINGS

FIG. 8(*a*) is a graphical representation of the phase and magnitude relationships among the currents flowing in an AC arc furnace having three electrode current loops.

FIG. 8(*b*) is a graphical vector representation of the arc-deflecting rotating magnetic field present at each electrode in a typical AC arc furnace as generated by the currents in the other electrode loops as represented in FIG. 8(*a*).

FIG. 10(*a*) is a vector diagram showing the current flow through, and magnetic field generated by, an auxiliary coil arranged in the shell of an AC arc furnace in accordance with the present invention.

FIG. 10(*b*) is a plan view of the vector diagram of FIG. 10(*a*).

DESCRIPTION OF THE PREFERRED EMBODIMENTS

Figure 1:
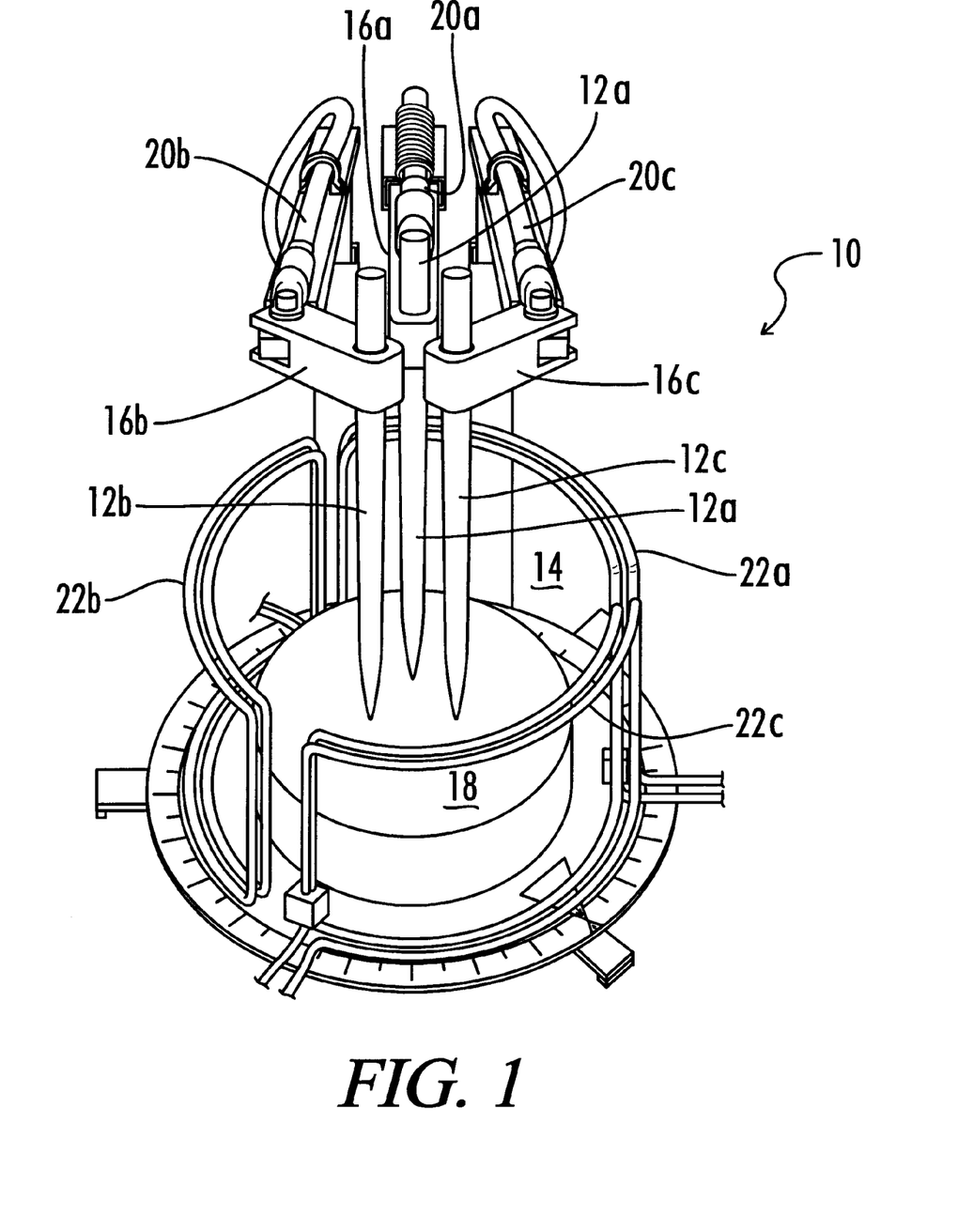
FIG. 1 is an oblique view of one embodiment of the AC arc furnace of the present invention with the furnace shell removed.
Figure 2:
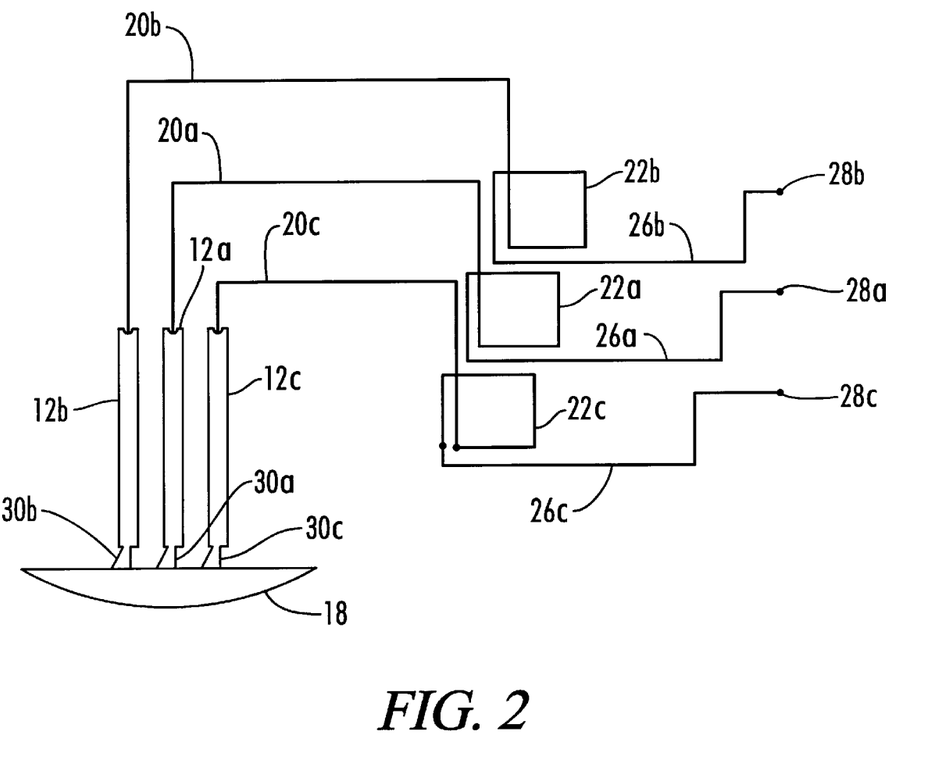
FIG. 2 is a wiring diagram of the electrical components of the AC arc furnace of FIG. 1.

The AC arc furnace 10 of the present invention is shown in FIG. 1, with the furnace shell removed to facilitate visualization of the auxiliary coil system. FIGS. 2 through 5 illustrate in schematic form portions of the furnace 10 of FIG. 1. First, second, and third electrodes 12*a*, *b*, and *c* are mechanically and electrically connected to corresponding electrode terminals 16*a*, *b*, and *c* and are arranged and suspended in vertical columns inside the furnace chamber 14. The lower tip portions of the electrodes 12*a–c* are positioned above the conductive material 18 that is to be melted inside the furnace 10. The electrodes 12*a–c* are preferably conventional graphite electrodes commonly used in arc furnaces for the making of steel.

First, second, and third auxiliary coils 22*a*, *b* and *c* are positioned in or on the furnace shell 24 (FIGS. 3, 4 and 5) proximate a corresponding electrode 12*a–c*. The coils 22*a–c* have vertical legs and a generally upstanding rectangular shape with a convex profile to conform to the shape of the shell 24. As will be further described below, the coils 22*a–c* can have multiple turns as physically shown in FIG. 1 or a single turn as shown schematically in FIGS. 2, 4, and 5.

Each of the electrode terminals 16*a–c* is connected by respective electrode power cables 20*a*, *b*, and *c* to a corresponding coil 22*a–c*. In a preferred embodiment as shown in FIGS. 2–5, the coils 22*a–c* are electrically connected by coil power cables 26*a*, *b*, and *c* to transformer secondary terminals 28*a*, *b*, and *c* of a conventional three-phase AC electrode power circuit (not shown). Thus, the coils 22*a–c* are electrically in series with the electrode current loops formed by electrode power cables 20*a–c*, electrodes 12*a–c*, arcs 30*a–c* (FIG. 2) and conductive material 18.

Figure 3:
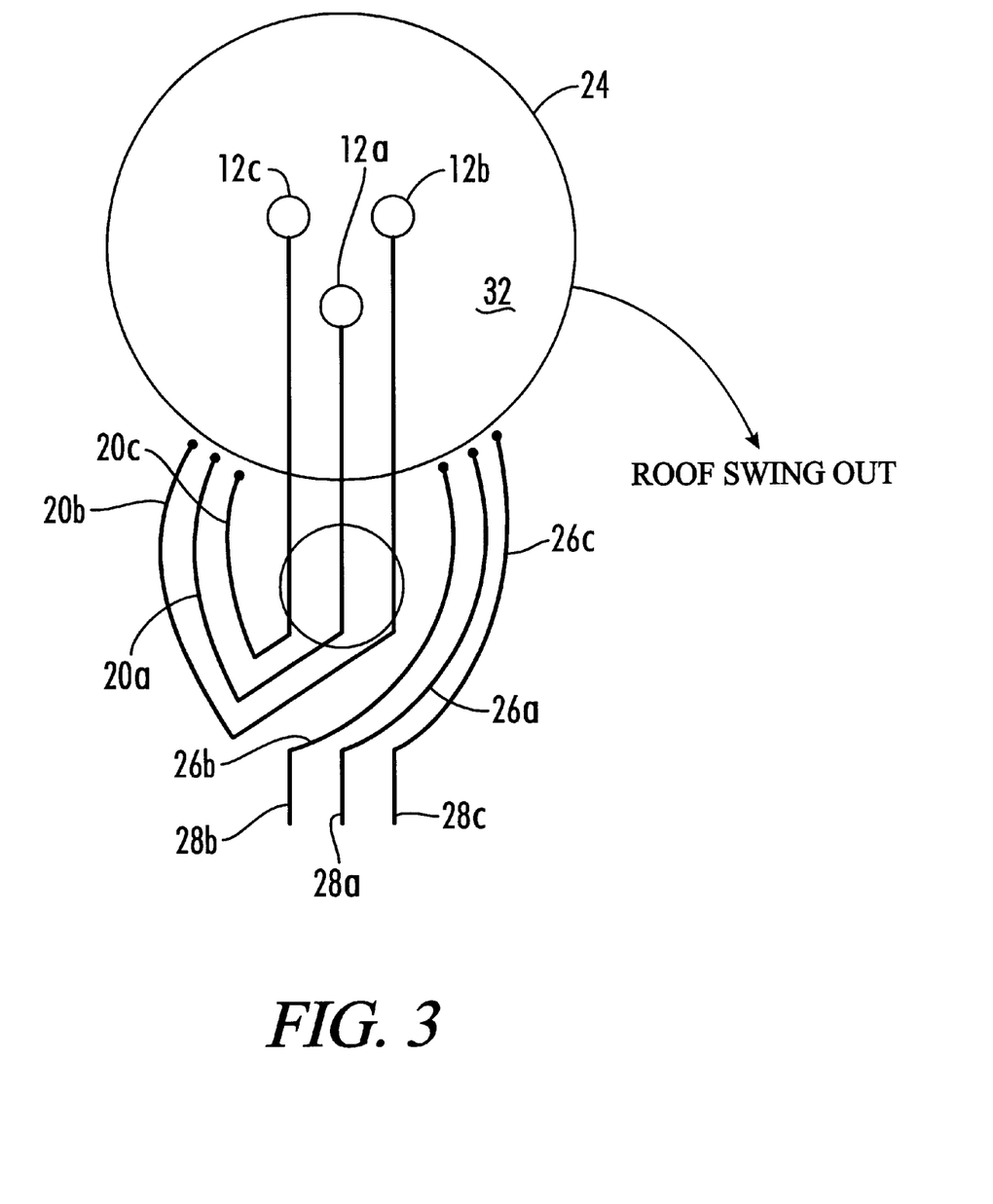
FIG. 3 is a schematic plan view of the AC arc furnace of FIGS. 1 and 2, showing the physical arrangement of the electrical cables from the power transformer to the auxiliary coil system and from the auxiliary coil system to the electrode terminals.

Note that the electrodes 12*a–c* and furnace chamber 14 are accessible by means of a conventional swing-out furnace roof 32 (FIG. 3). For practical reasons, the coils 12*a–c* should leave the roof 32 free to move and therefore should be mechanically secured to the shell 24.

Although a separate coil power circuit (not shown) can be used for the coil system, electrically connecting the coils 22*a–c* in series with the electrodes 12*a–c* allows the electrode power circuit to function also as the coil power circuit. This provides several advantages. As the electrode current varies (as it will during normal operation of an AC arc furnace) the arc-deflecting magnetic fields generated internally will also vary. Because the coil current is in the same electrical path as the electrode current in a series configuration, the counteracting externally generated magnetic fields will also vary proportionately. Also, most AC arc furnaces have a reactor (not shown) added to the primary side of the power transformer, to increase the total reactance of the electrode power circuit and system. In the preferred embodiment of this furnace 10, the reactance of the auxiliary coils 22*a–c* added to the secondary side of the power transformer can dispense with the need to add a reactor on the primary side.

Figure 4:
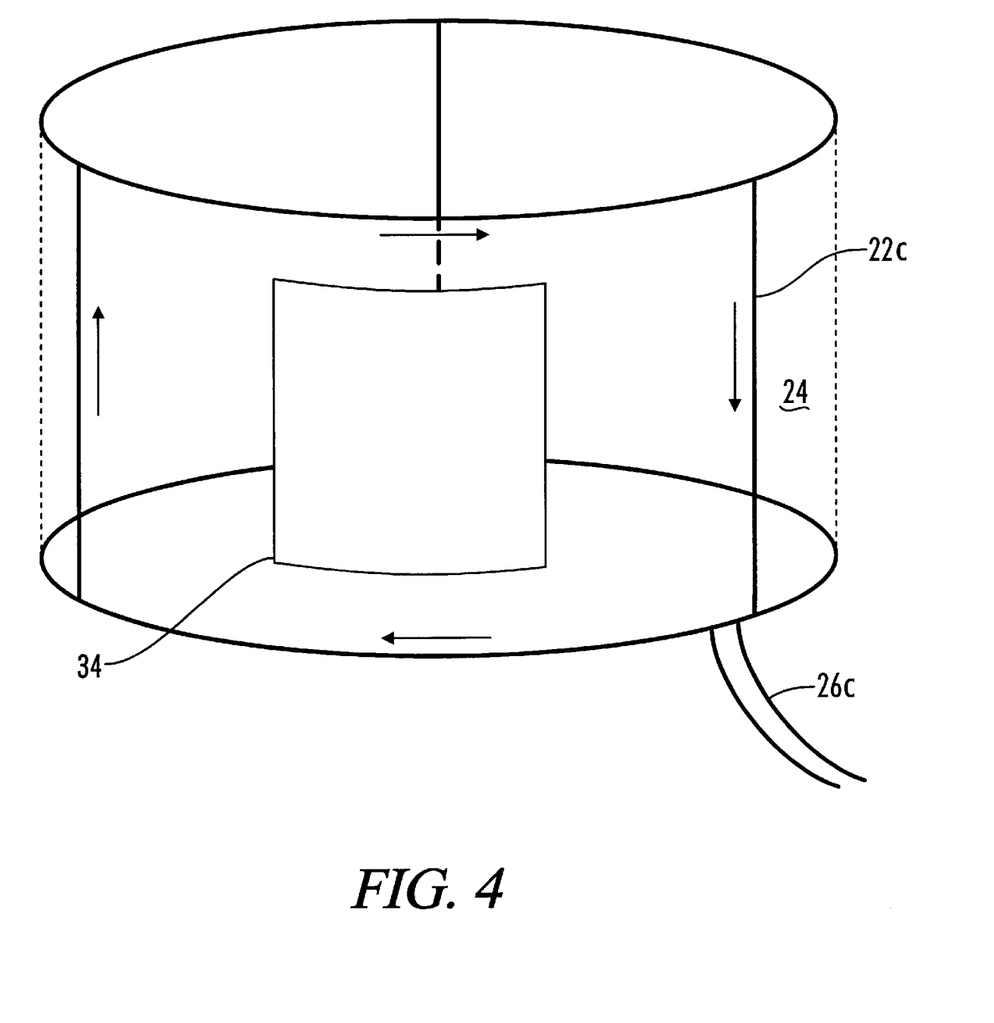
FIG. 4 is a schematic side view of a portion of the AC arc furnace of FIGS. 1–3, showing the placement of a non-magnetic window through the furnace shell.
Figure 6:
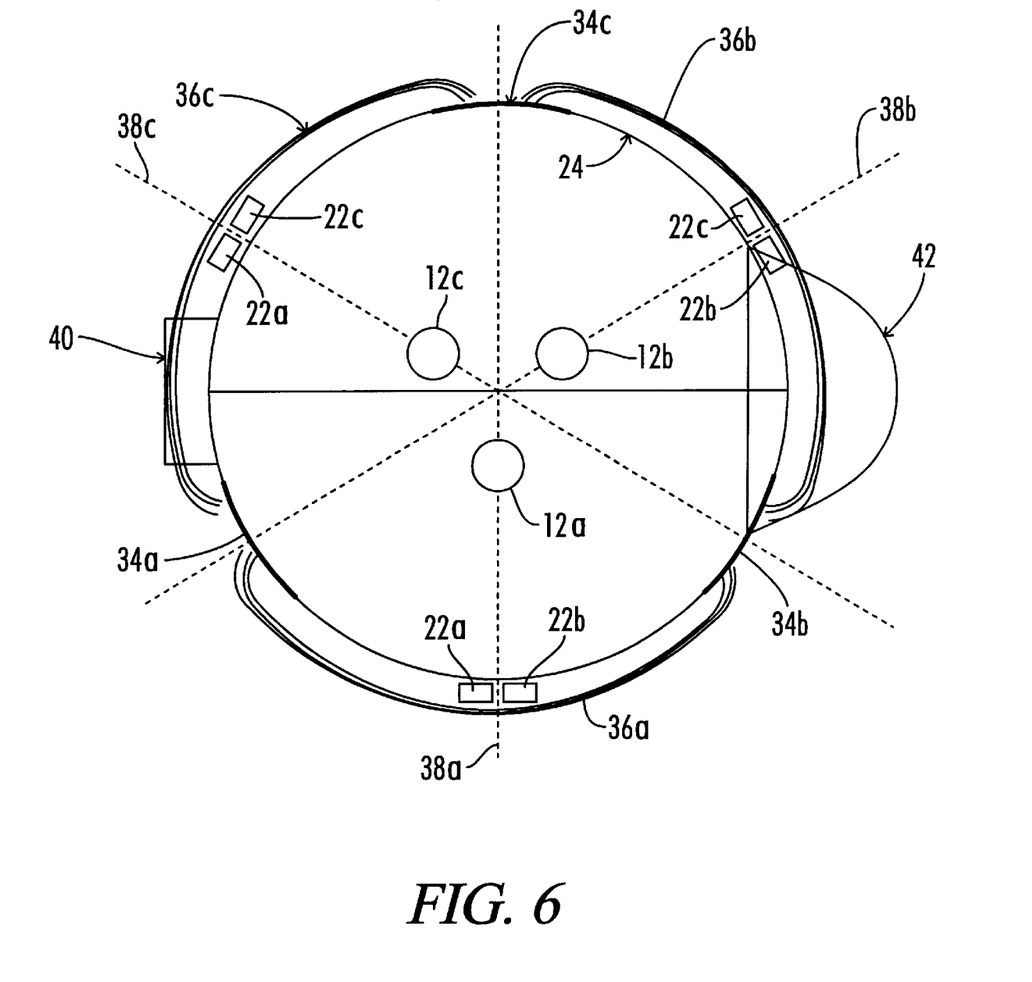
FIG. 6 is a top cutaway view of another embodiment of the AC arc furnace of the present invention having exterior laminations fabricated around the furnace shell.

Conventional arc furnace shells are typically constructed from water-cooled steel pipes. Accordingly, to facilitate the penetration of magnetic fields generated by the auxiliary coil system of this invention, non-magnetic windows 34*a*, *b*, and *c* (best seen in FIG. 6) should be provided in the shell 24 within a geometric boundary defined by each coil 22*a–c*. The material selected for the windows 34*a–c* should be a non-magnetic metal having relatively low eddy current losses, such as copper. As shown in FIGS. 4 and 6, the windows 34*a–c* can be generally rectangular with a convex profile conforming to the shape of the shell 24.

Figure 5:
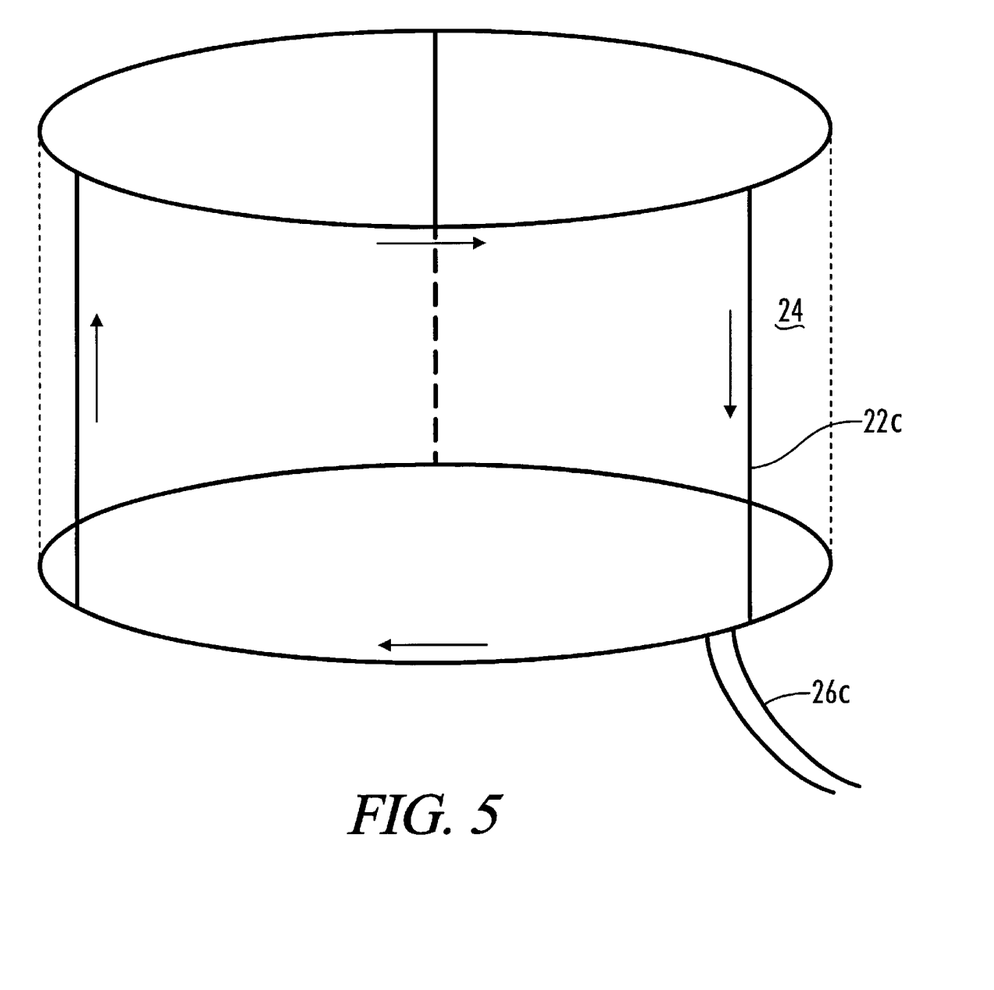
FIG. 5 is a schematic side view of a portion of the AC arc furnace of FIGS. 1–4, showing a current path through one of the auxiliary coils.

Preferably, each of the coils 22*a–c* will have a defined size, shape, orientation, and current flow operative to generate a magnetic field that will penetrate the shell 24 and offset or cancel the magnetic field at each arc 30*a–c* (FIG. 2) that is generated internally by the electrode current loop associated with its corresponding electrode 12*a–c*. FIG. 5 shows the general orientation of, and direction of current flow through, the auxiliary coils 22*a–c*. The determination of coil geometry requires an understanding of the magnitude and direction of the magnetic fields generated internal to a conventional AC arc furnace. These fields are shown in vector graphic form in FIG. 8(*b*), as a function of the three phase electrode currents shown in FIG. 8(*a*). The internally generated magnetic field at each arc 30*a–c* (FIG. 2) is parallel and rotating, similar to $H_0$ at the mid-point of the triangle of FIG. 8(*b*).

Figure 8A:
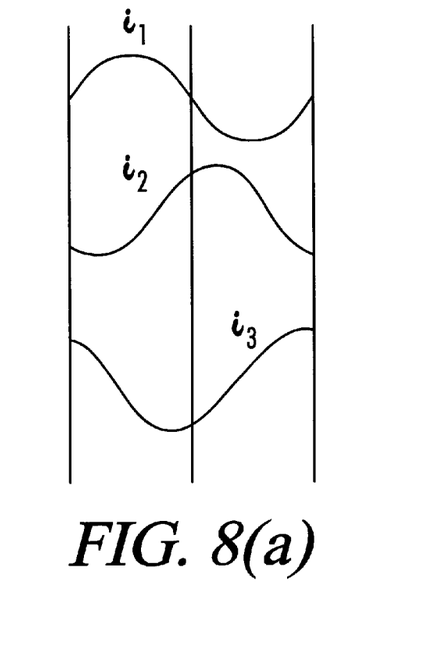
Figure 8B:
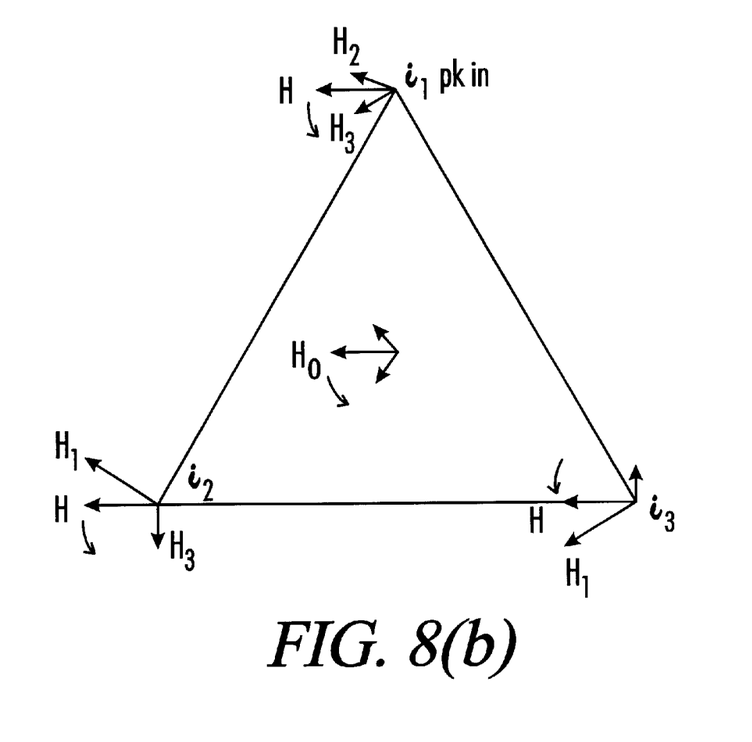

The magnitude of $$H = \frac{\hat{\imath}}{2\pi(PCD)}$$

where $\hat{\imath}$ is the peak current $=\sqrt{2}$ I mrs The magnitude of $$Ho = \frac{\sqrt{3}\,\hat{\imath}}{2\pi(PCD)}$$

Unlike in the case of a DC arc furnace, the application of a counteracting external magnetic field requires consideration of AC electromagnetic fields with the attendant complications of eddy-current effects and shielding effects of the conductive material 18.

The internal arc-deflecting magnetic field generated at each arc 30*a–c*, for example, is produced by the currents in the other two electrode loops. This field is a rotating one. Between the three electrodes 12*a–c*, the field is generally horizontal, at a relatively constant amplitude (assuming the kA is constant), and rotates at 50 or 60 cycles, depending on the operating frequency of the electrode power circuit. Under each electrode 12*a–c*, the field is similar, except that it is lower in amplitude. To reduce the effect of these internal arc-deflecting fields so as to eliminate arc blowout, a field that is equal and opposite to the rotating, horizontal field as seen by each arc 30*a–c* must be added by the auxiliary coil system.

Figure 9:
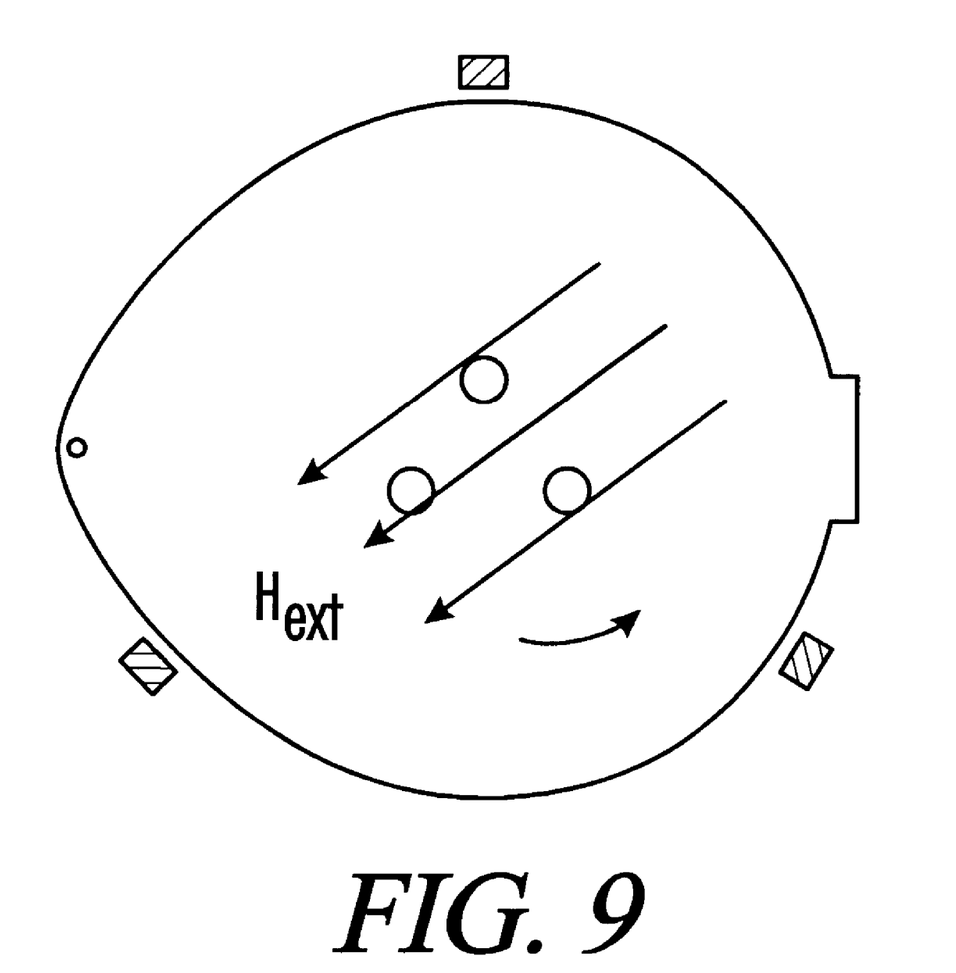
FIG. 9 is a vector diagram of the orientation and direction of an ideal externally generated magnetic field used to counteract the effects of an internally generated magnetic field as shown in FIG. 8(*b*).

Understanding that the internal field at each arc is parallel and rotating, the externally generated field can be obtained from three vertically oriented coils 22*a–c* outside the shell 24, operated at the same frequency as the electrodes 12*a–c*. The field magnitude (or phase) must be opposed, i.e., a rotating field 180° out of phase. Theoretically, the ideal external field $H_{ext}$ should be oriented with respect to the electrode columns as shown in FIG. 9. Looking at FIGS. 1 and 6, in one embodiment of the furnace 10, the coils 22a–c are arranged to substantially extend around the full circumference of the shell 24. As best seen on FIG. 6, when the electrodes 12a–c are arranged in a typical equilateral triangular pattern, the vertical legs of adjacent coils 22a–c are positioned so that each of the gaps between the coils 22a–c are substantially aligned with a line 38a, b, or c that bisects a respective electrode and the electrode "triangle." The non-magnetic windows 34a–c are centered in the geometric boundary defined by the corresponding coils 22a–c and on the gaps between adjacent laminations 36a–c.

The magnitude of the field generated by the coils 22a–c must reach the kA turns/m level in order to oppose the internal field. Thus, using the analysis described above, for I=60 kA rms and where PCD=1.4 m, then H=9.65 kA turns/m.

An alternative electrical design of the auxiliary coils 22a–c could involve several coil turns in order to reduce the current requirements. Therefore, to estimate electrical design parameters, the (amp×turns) necessary in these coils must be calculated.

Figure 10A:
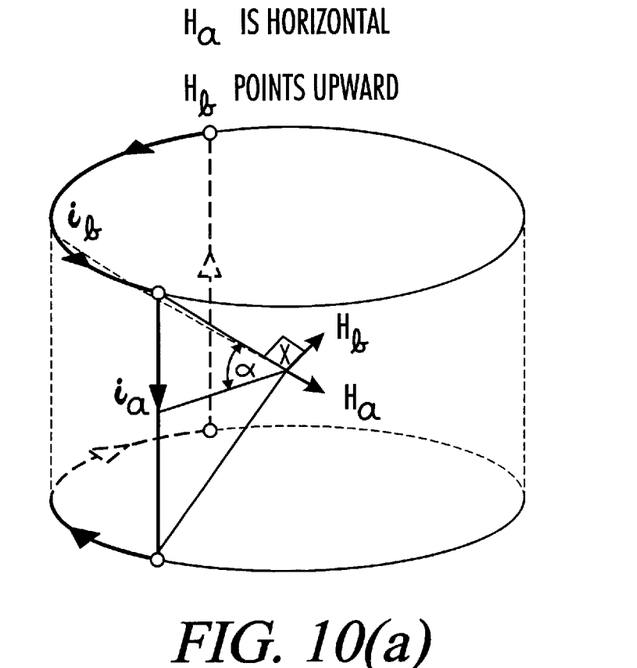
Figure 10B:
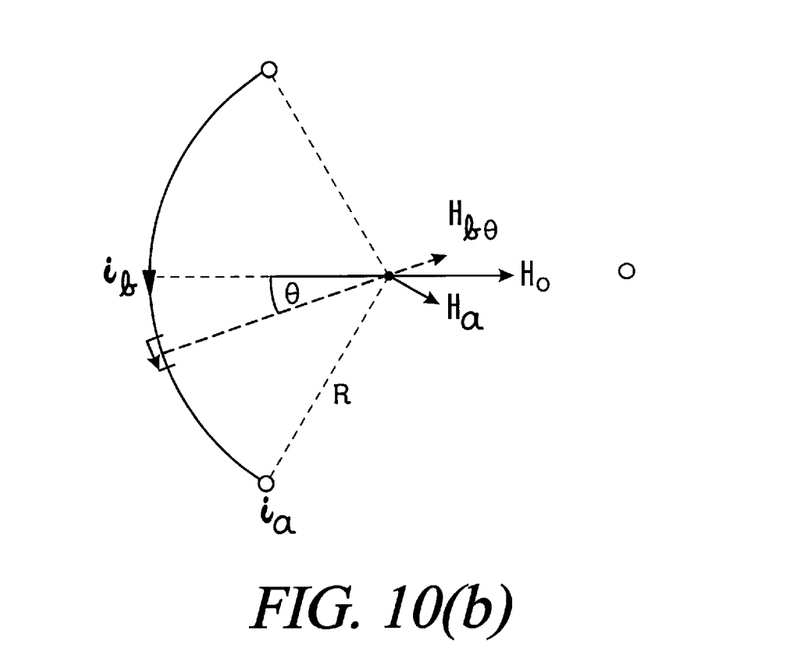
Figure 11:
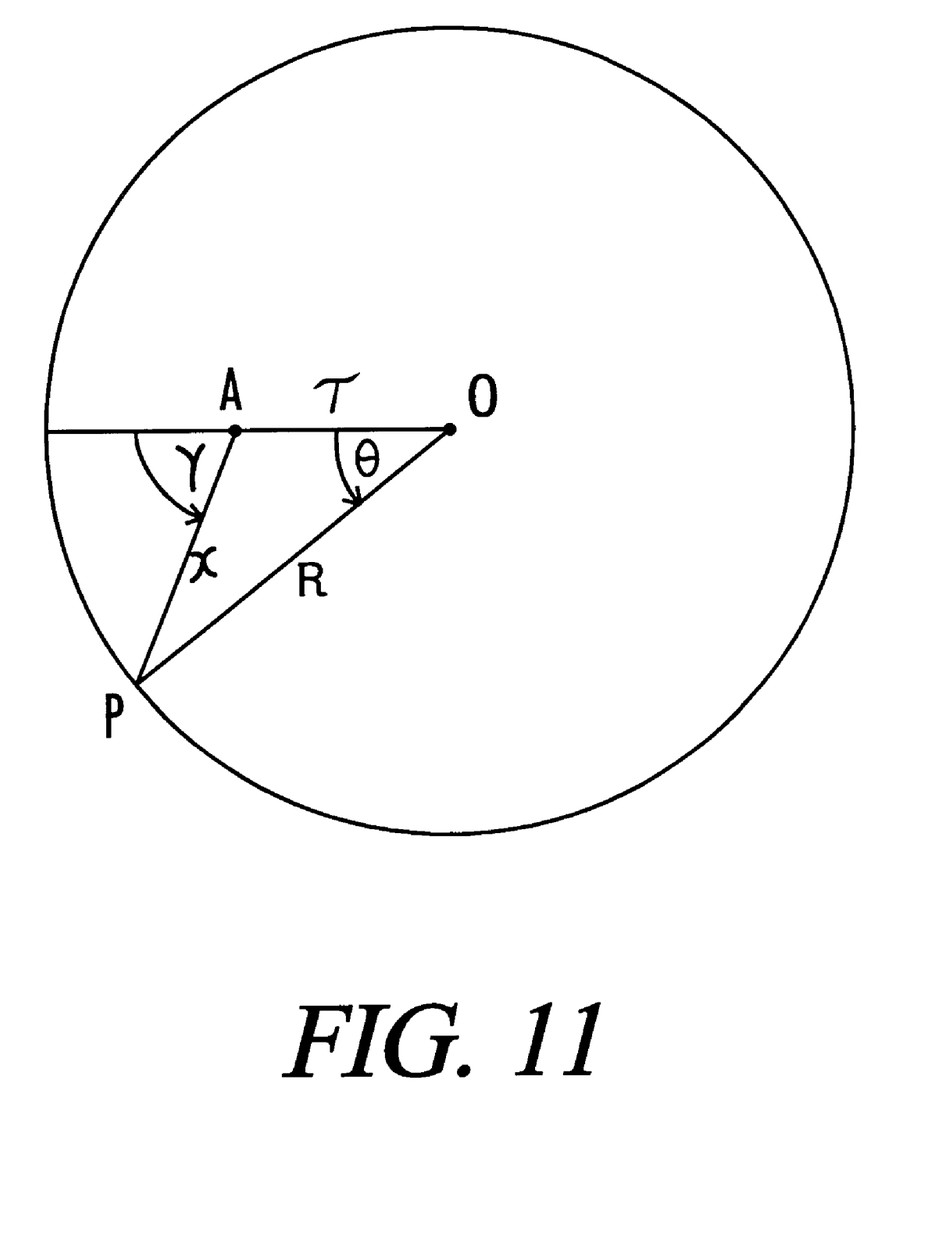
FIG. 11 is a graphical representation of an ideal circular auxiliary coil for purposes of calculating the coil inductance.

Referring to FIGS. 10(a) and 10(b), it is apparent from the symmetry that the resultant field is directed horizontally, along $H_0$.

The contribution from $i_a$:

$$Ha = \frac{ia}{2\pi R}(2 - \cos\alpha) \quad \therefore Ho(a) = \frac{\sqrt{3}}{2} Ha$$

The contribution from $i_b$:
The horizontal component of $H_b$ is Hb sin α
The current element at angle θ generates a component $dH_{0(b)}$ along $H_0$ given by: d H0(b)=Hb$_\theta$cos θ
To obtain the full contribution, integrate over θ:

$$Ho(b) = 2\int_0^{60°} Hb_\theta \cdot \cos\theta \cdot d\theta = 2 \cdot Hb\theta \cdot \frac{\sqrt{3}}{2} = \sqrt{3}\ Hb\theta$$

Allowing for the elevation angle α:

$$Ho(b) = \frac{ib\sqrt{3}\sin\alpha}{2\pi/\cos\alpha} \quad \text{where } \left(\frac{R}{\cos\alpha} = \text{distance of } ib \text{ from center}\right)$$

Thus, the contribution of $i_a$ and $i_b$ to the horizontal field $H_0$ is $$Ho = \frac{ia}{2\pi R}(1-\cos\alpha)\frac{\sqrt{3}}{2} + \frac{ib\sqrt{3}\sin\alpha}{2\pi R/\cos\alpha}$$

Making $i_a=i_b$ and noting that the effect due to the full loop is double, the final result for $H_0$ from one of the coils is:

$$Ho = \frac{i}{2\pi R}\left[\sqrt{3}(1-\cos\alpha) + 2\sqrt{3}\sin\alpha_2\cos\alpha\right]$$

Finally, adding the effects of the other two coils:

Referring to the diagram above, when the field from coil 12 is at a peak level, the other fields are equal, at a level of ½ of peak and phased at 120°. The instantaneous vectors are shown above. This shows that the net contribution of coils 23 and 31 to coil 12 is to add 50% more. So the final result for three coils is $$Ho = \frac{i}{2\pi R}\left[\sqrt{3}(1-\cos\alpha) + 2\sqrt{3}\sin\alpha\cos\alpha\right]$$

As one example, consider a 6.4 meter furnace with a coil height of 3 meters. Then:

$$\tan\alpha = \frac{1.5m}{3.2m}, \text{ so } \alpha = 25.1°;$$

$$\sin\alpha = 0.424; \cos\alpha = 0.905$$

$$R = 3.2m$$

Also, $$Ho = \frac{1.5}{20.1(m)}[0.165 + 1.329] = i\frac{0.112}{m}$$

For a 60 kA operation, this field should be about 9.65 kA/m. Then, if there are n turns of i amps for each coil 22a–c, the necessary magnitude of ni is given by:

$$ni \times \frac{0.112}{m} = 9.65 \text{ kA/m}$$

or $ni = 86.2$ kA

Approximately 86 kA turns is needed from each coil as noted above. The open coil so far described would have a reactance of the order of 4.3 (mΩ). So, for one or two turns of each coil the approximate electrical data could be:

| N Turns | I (kA) | wL (mΩ) | Volts | MVA |
|---|---|---|---|---|
| 1 | 86 | 4.3 | 370 | 55 |
| 2 | 43 | 17.2 | 740 | 55 |
| 3 | 28.7 | 38.4 | 1100 | 54.7 |

Figure 7:
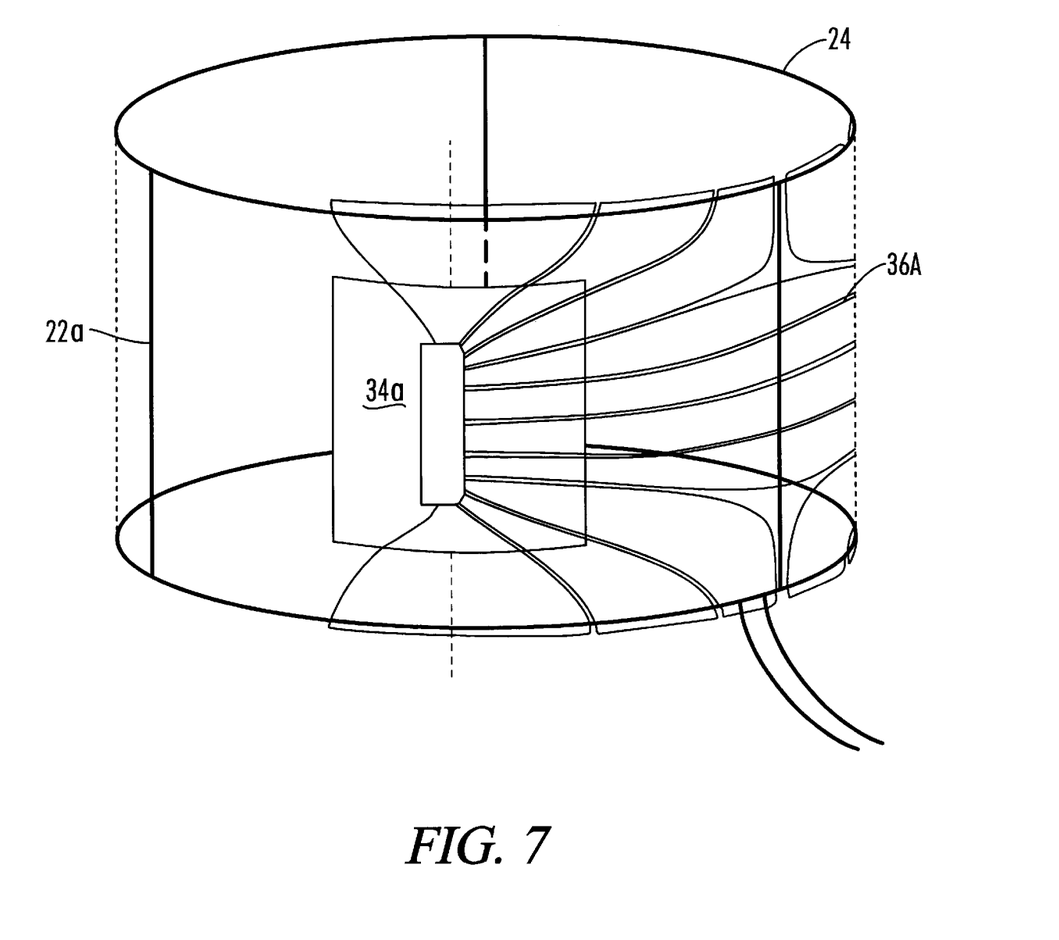
FIG. 7 is a partial side view of the AC arc furnace of FIG. 6, showing a physical arrangement of the external laminations.

To drive the three coils 22a–c as defined above will require approximately 55 MVA(R) of transformer capacity. It is obviously advantageous to try to reduce this requirement. There are two factors that will help: (i) mutual inductance and (ii) use of a laminated iron-core structure on the outside of the shell. The lamination structure is the most important and may be essential in order to reduce external fields to protect furnace operators and nearby equipment. Therefore, a second embodiment of the furnace 10 is shown in FIGS. 6 and 7 with lamination structures 36a, b, and c preferably fabricated as part of the shell 24 from silicon-steel sheets. In a typical AC arc furnace, openings will be needed in the laminations 36a–c for other conventional components, such as a slag door (40 on FIG. 6) and oxygen lances (not shown). As best seen in FIGS. 6 and 7, the laminations 36a–c are arranged around the circumference of the shell 24 and are centered on the vertical legs of adjacent coils 22a–c such that the windows 34a–c are centered on the gaps between adjacent laminations 36a–c.

Those of skill in the art will recognize that a full scale AC arc furnace that incorporates the novel concepts and structures of this invention will also need other more conventional components and sub-systems typically found in conventional AC arc furnaces. These additional components and sub-systems may include a water-cooling system for the shell and roof, an electrode power regulation circuit, an hydraulic or other mechanical system for moving the roof and electrodes, an oxygen lance system, a burner system, an off-gas evacuation system, a tap changer (42 on FIG. 6), and the like. Because these ancillary arc furnace sub-systems are conventional in design and operation, they have not been fully illustrated or described here for the sake of simplicity and clarity.

Thus, although there have been described particular embodiments of the present invention of a new and useful AC Arc Furnace with Auxiliary Electromagnetic Coil System for Control of Arc Deflection, it is not intended that such references be construed as limitations upon the scope of this invention except as set forth in the following claims.

What is claimed is:

1. An AC arc furnace having a shell enclosing a chamber, a plurality of electrodes positioned within the chamber, each of the electrodes connected to an external electrode AC power circuit to generate and sustain an arc between the electrodes and material to be melted that is placed in the chamber, the furnace further comprising:

an auxiliary coil system connected to a coil power circuit, the auxiliary coil system comprising a plurality of coils corresponding to the number of electrodes, each coil arranged around the furnace shell proximate to a corresponding electrode in a defined coil geometry so that when the coil power circuit is activated, each coil generates an external magnetic field that penetrates the shell to control deflection of the arc of its corresponding electrode.

2. The AC arc furnace of claim 1, wherein each coil is electrically connected in series with its corresponding electrode so that the electrode power circuit is also the coil power circuit.

3. The AC arc furnace of claim 2 further comprising lamination structures positioned outside of and proximate each of the coils, the lamination structures operable to reduce the magnitude of any external magnetic fields generated by the coils.

4. The AC arc furnace of claim 1 wherein each coil is arranged around the shell and connected to the coil power circuit so that the external magnetic field applied to the arcs has a magnitude and direction that effectively cancels out an internal magnetic field generated by the arc itself and by the electrode power circuit.

5. The AC arc furnace of claim 4 wherein the furnace shell includes at least one non-magnetic window positioned to facilitate penetration into the furnace of the magnetic fields generated by the auxiliary coil system.

6. The AC arc furnace of claim 5 wherein the external magnetic field generated by the coils is oriented in a horizontal plane with reference to the electrodes, is operated at a coil frequency that corresponds to a frequency of electrode operation, and is rotating 180 degrees out of phase with reference to the internal magnetic field.

7. An AC arc furnace comprising first, second, and third electrodes arranged inside a furnace chamber enclosed by a shell, each electrode electrically connected to an electrode power source in series through corresponding first, second, and third electromagnetic coils, the electromagnetic coils arranged around the furnace shell in a pre-defined geometric pattern proximate the corresponding electrodes so that when each of the first, second and third electrodes receives power from the electrode power source and generates an arc inside the furnace, external magnetic fields are generated by the corresponding series connected first, second, and third electromagnetic coils, the external magnetic fields penetrating the shell to control deflection of the arcs caused by internal magnetic fields.

8. An AC arc furnace comprising:

a. first, second, and third electrodes suspended vertically inside a cylindrical furnace shell in an equilateral triangular pattern and electrically connected to a three-phase AC electrode power system external to the shell;

b. first, second, and third electromagnetic coils arranged around the circumference of the shell, each of the coils having vertical legs and a convex profile conforming to the shell, with the vertical legs of adjacent coils substantially centered on a line bisecting a respective one of the electrodes and the triangular electrode pattern;

c. each of the electromagnetic coils electrically connected in series between a corresponding one of the electrodes and the electrode power system;

d. first, second, and third silicon-steel lamination structures arranged around the circumference of the shell and substantially centered on respective adjacent vertical legs of the coils; and e. first, second, and third non-magnetic windows formed in the shell and substantially centered within a boundary defined by the shape of a respective coil and centered on gaps between respective adjacent lamination structures.

9. In an AC arc furnace having electrodes positioned inside a chamber and connected to an electrode power source external to the chamber to generate arcs from the electrodes to meltable material placed in the chamber, a method of controlling unwanted deflection of arcs caused by internal magnetic fields comprising:

a. positioning one or more auxiliary electromagnetic coils in or around the shell and proximate the electrodes;

b. applying sufficient AC power to the auxiliary coils when the arcs are being generating inside the chamber so that external magnetic fields are generated by the coils; and c. adjusting the position and orientation of the coils so that the external magnetic fields penetrate into the furnace chamber and apply a force to the arcs that counteract arc deflection forces created by the internal magnetic fields.

10. The method of claim 9 further comprising restricting extension of the external magnetic fields outside of the shell by enclosing each of the coils in a conductive lamination structure.

11. The method of claim 9 wherein the power is supplied to the coils by the step of connecting the coils in series between a corresponding electrode and the power source for that electrode.

* * * * *